(12) United States Patent
Michelet et al.

(10) Patent No.: US 9,186,732 B2
(45) Date of Patent: Nov. 17, 2015

(54) CUTTING INSERT WITH GROOVED SURFACE DEFINING PLURAL SUPPORT SURFACES

(75) Inventors: Benjamin Michelet, Bourges (FR); Bertrand Riviere, Bourges (FR)

(73) Assignee: SECO TOOLS AB, Fagersta (SE)

( * ) Notice: Subject to any disclaimer, the term of this patent is extended or adjusted under 35 U.S.C. 154(b) by 258 days.

(21) Appl. No.: 13/261,667

(22) PCT Filed: Oct. 27, 2011

(86) PCT No.: PCT/EP2011/068856
§ 371 (c)(1),
(2), (4) Date: May 1, 2013

(87) PCT Pub. No.: WO2012/059395
PCT Pub. Date: May 10, 2012

(65) Prior Publication Data
US 2013/0259586 A1    Oct. 3, 2013

(30) Foreign Application Priority Data

Nov. 3, 2010 (EP) .................................... 10189748
Nov. 3, 2010 (EP) .................................... 10189749

(51) Int. Cl.
*B23C 5/20* (2006.01)
*B23C 5/08* (2006.01)
(Continued)

(52) U.S. Cl.
CPC . *B23C 5/205* (2013.01); *B23C 5/08* (2013.01); *B23C 5/207* (2013.01); *B23C 5/22* (2013.01); *B23C 5/2208* (2013.01); *B23C 5/2221* (2013.01); *F02C 9/00* (2013.01); *B23C 2200/367* (2013.01); *B23C 2210/0442* (2013.01); *B23C 2210/168* (2013.01); *Y10T 407/1906* (2015.01); *Y10T 407/1936* (2015.01); *Y10T 407/2266* (2015.01); *Y10T 407/235* (2015.01); *Y10T 407/245* (2015.01)

(58) Field of Classification Search
CPC .. B23C 5/06; B23C 5/2213; B23C 2200/085; B23C 2200/205
USPC .................................. 407/113, 114, 115, 116
See application file for complete search history.

(56) References Cited

U.S. PATENT DOCUMENTS 3,490,117 A * 1/1970 Hertel .......................... 407/104
4,074,949 A    2/1978 Hochmuth et al.
(Continued)

FOREIGN PATENT DOCUMENTS

CN    1223185 A    7/1999
DE    19600172 A1   8/1997
(Continued)

*Primary Examiner* — Will Fridie, Jr.
(74) *Attorney, Agent, or Firm* — Corinne R. Gorski

(57) ABSTRACT

A cutting insert includes a first mounting surface, a second mounting surface located on an opposite side of the insert from the first mounting surface, and a first side surface disposed between the first mounting surface and the second mounting surface. The insert further includes a first groove extending substantially diagonally across the first side surface and dividing the first side surface into discrete, separated, triangular first and second first side support surfaces. The first and second first side support surfaces are each bounded along first and second edges thereof by rake surfaces forming non-zero angles with the first and second side support surfaces and along third edges thereof by the groove.

14 Claims, 4 Drawing Sheets

(51) Int. Cl.
*B23C 5/22* (2006.01)
*F02C 9/00* (2006.01)

(56) References Cited

U.S. PATENT DOCUMENTS

| | | | |
|---|---|---|---|
| 4,294,566 A * | 10/1981 | Boone | 407/114 |
| 5,876,160 A | 3/1999 | Johnson | |
| 6,227,772 B1 * | 5/2001 | Heinloth et al. | 407/113 |
| 7,063,489 B2 | 6/2006 | Satran | |
| 7,094,007 B2 * | 8/2006 | Satran et al. | 407/113 |
| 7,104,735 B2 * | 9/2006 | Johnson et al. | 407/42 |
| 7,306,409 B2 | 12/2007 | Stabel et al. | |
| 8,454,278 B2 * | 6/2013 | Hartlohner et al. | 407/113 |
| 2004/0013478 A1 * | 1/2004 | Dehn et al. | 407/113 |
| 2005/0063792 A1 * | 3/2005 | Satran | 407/113 |
| 2005/0169716 A1 | 8/2005 | Smilovici et al. | |
| 2009/0047078 A1 | 2/2009 | Kirchberger | |
| 2009/0092451 A1 | 4/2009 | Harif | |
| 2009/0169313 A1 * | 7/2009 | Satran | 407/40 |

FOREIGN PATENT DOCUMENTS

| | | |
|---|---|---|
| DE | 102007011395 A1 | 9/2008 |
| EP | 1462199 A1 | 9/2004 |
| GB | 1296206 | 11/1972 |
| RU | 2284249 C1 | 9/2006 |
| RU | 2342225 C1 | 12/2008 |
| RU | 2372168 C1 | 11/2009 |

* cited by examiner

CUTTING INSERT WITH GROOVED SURFACE DEFINING PLURAL SUPPORT SURFACES

RELATED APPLICATION DATA

This application is a §371 National Stage Application of PCT International Application No. PCT/EP2011/068856 filed Oct. 27, 2011 claiming priority of European Application Nos. 10189748.6 and 10189749.4, both filed Nov. 3, 2010.

BACKGROUND AND SUMMARY

The present invention relates generally to cutting inserts and, more particularly, to indexable cutting inserts with grooved surfaces defining plural support surfaces.

U.S. Patent Application Publication US2009/0047078, which is incorporated by reference, shows a cutting insert having a grooved surface defining plural support surfaces. The support surfaces are flat and meet at a sharp wedge base to form a wedge angle.

It is desirable to provide cutting inserts that facilitate efficient removal of chips cutting from a workpiece.

In accordance with an aspect of the present invention, a cutting insert includes a first mounting surface, a second mounting surface on an opposite side of the insert from the first mounting surface, and a first side surface between the first mounting surface and the second mounting surface. The insert further includes a first groove extending substantially diagonally across the first side surface and dividing the first side surface into discrete, separated, triangular first and second first side support surfaces, the first and second first side support surfaces each being bounded along first and second edges thereof by rake surfaces forming non-zero angles with the first and second side support surfaces and along third edges thereof by the groove.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
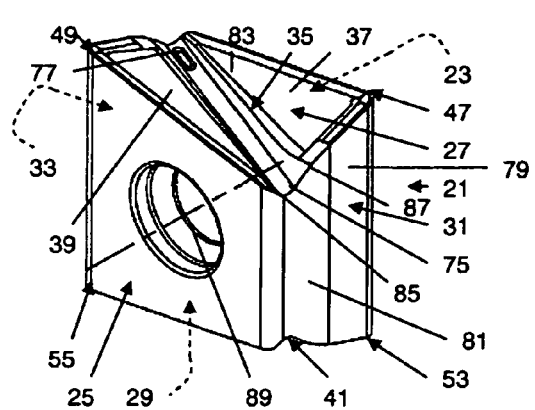
FIGS. 1A-1D are perspective, top, first side, and second side views of a cutting insert according to an aspect of the present invention.
Figure 1C:
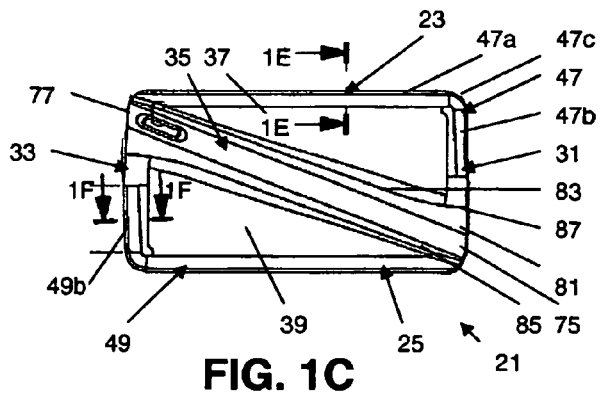
Figure 1B:
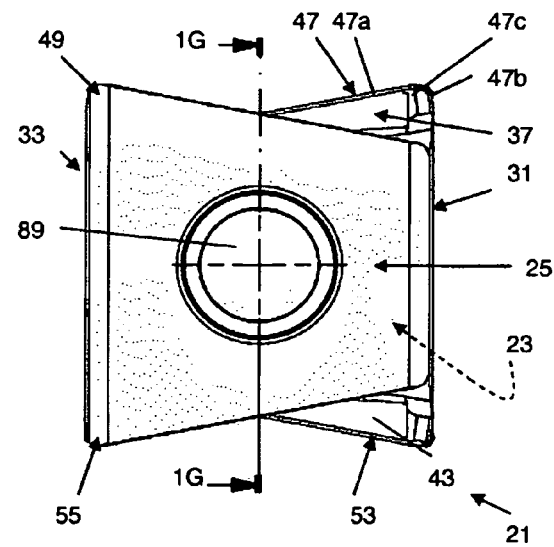
Figure 1E:
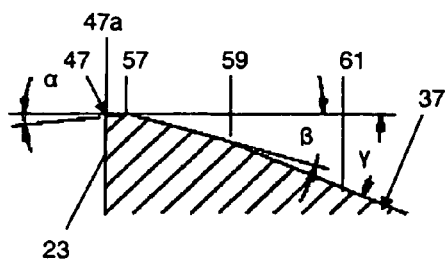
FIG. 1E is a cross-sectional view taken at section 1E-1E of FIG. 1C.
Figure 1F:
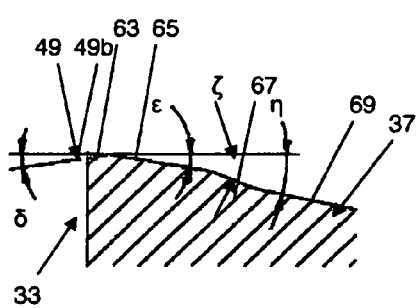
FIG. 1F is a cross-sectional view taken at section 1F-1F of FIG. 1C.
Figure 1D:
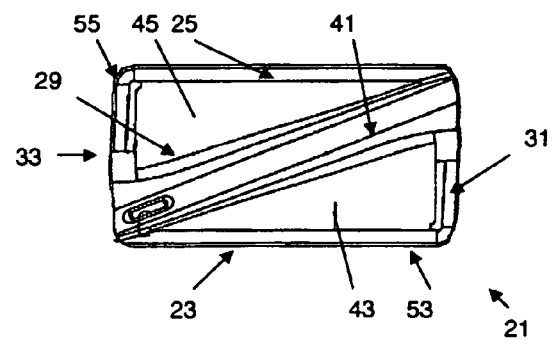
Figure 2:
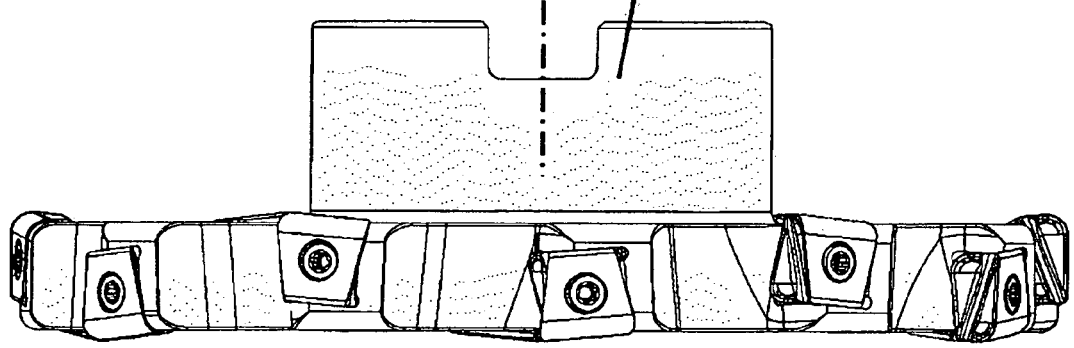
FIG. 2 is a perspective view of a cutting tool according to an aspect of the present invention.
Figure 3:
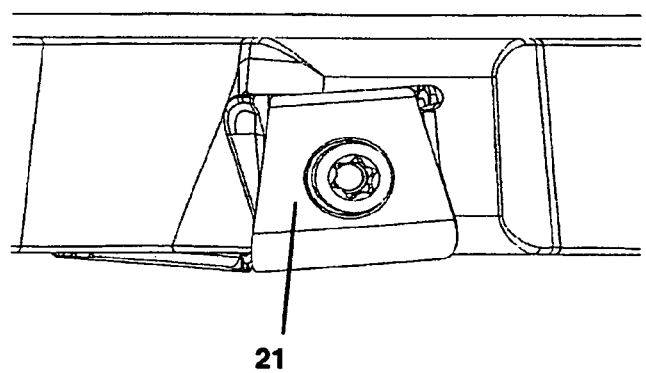
FIG. 3 is a perspective view of a portion of the cutting tool shown in FIG. 2.

FIGS. 1A-1F show an indexable cutting insert 21 or portions thereof according to an aspect of the present invention that is considered to have particular application in connection with milling tools such as the disc milling tool 200 shown in FIGS. 2 and 3 including a toolholder on which the insert 21 is mounted, but may be adapted for use with turning and other tools, as well. The term "toolholder" is defined for purposes of the present invention as broadly including toolholders with integral cutting insert pockets and toolholders in the form of cassettes that are adapted to be attached to a tool body, i.e., the cassette is a form of toolholder.

FIG. 2 shows a disc milling tool 200 having inserts 21 that each have two "left-handed" cutting edges and two "right-handed" cutting edges. The inserts 21 are indexed so that, on a top side of the disc, what shall be referred to as their left-handed cutting edges are exposed to a workpiece (not shown) and so that, on a bottom side of the disc, what shall be referred to as their right-handed cutting edges are exposed to the workpiece.

Figure 4B:
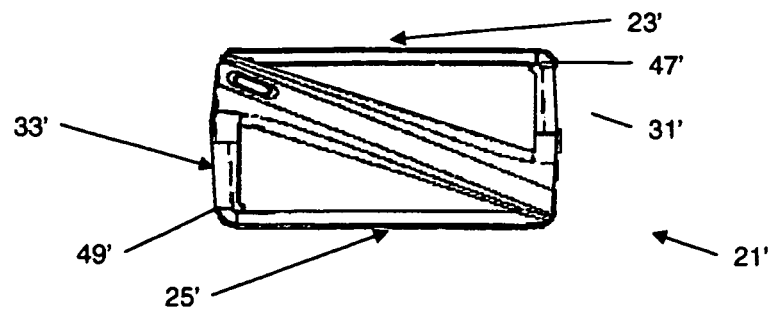
FIGS. 4A-4C are top, first side, and second side views of a cutting insert according to another aspect of the present invention.
Figure 4A:
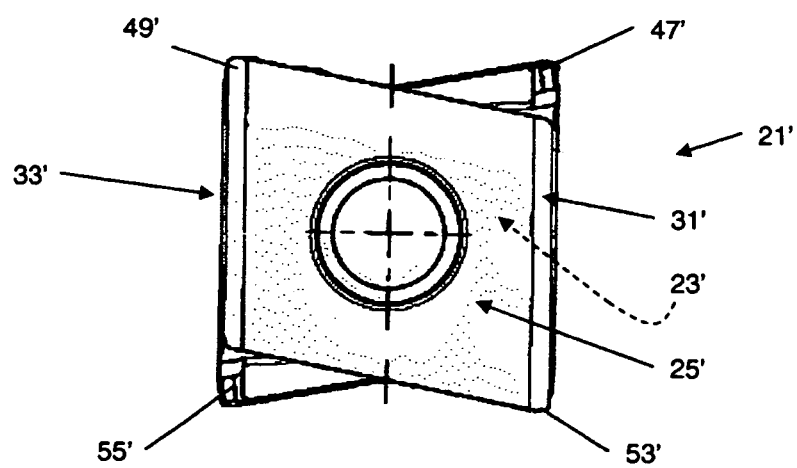
Figure 4C:
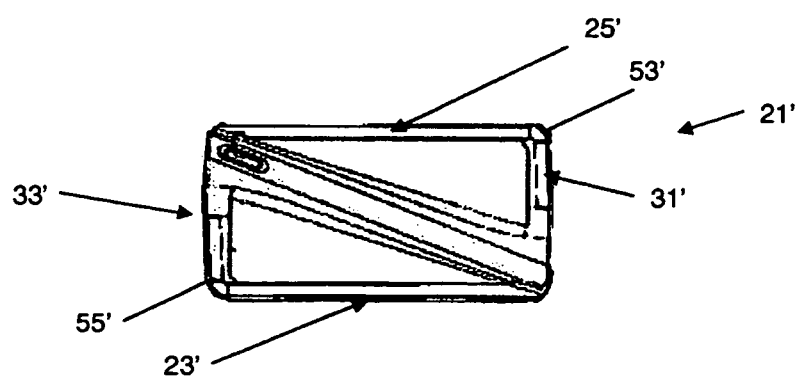

The inserts 21 are positioned on the tool so that, in the direction of rotation of the disc milling tool 200, they form a "positive" axial angle with an axis of rotation A of the disc milling tool, but they might instead be positioned so as to form a "negative" axial angle. Inserts used in a given tool may have cutting edges that all have the same "handedness", however, it will be appreciated that inserts with edges of different handedness, such as the insert 21, might be used in such a tool, instead. Likewise, inserts having all cutting edges of the same handedness might be positioned on a cutting tool so as to all form positive axial angles. An insert 21' having four cutting edges of the same handedness is shown in greater detail in FIGS. 4A-4C. The inserts 21 and 21' share many features and, accordingly, to simplify discussion, the insert 21 will be described, it being understood that the description generally applies as well to the insert 21', except where otherwise indicated.

The inserts 21 and 21' will ordinarily be made of a pressed and sintered cemented carbide, but may be made of other materials and by other processes, such as by grinding of a hard metal blank.

Referring to FIGS. 1A-1D, the insert 21 comprises a first mounting surface 23 and a second mounting surface 25 identical to the first mounting surface and on an opposite side of the insert from the first mounting surface. The insert 21 further comprises a first side surface 27 between the first mounting surface 23 and the second mounting surface 25 and a second side surface 29 between the first mounting surface and the second mounting surface and on an opposite side of the insert from the first side surface. The insert further comprises a first end surface 31 between the first mounting surface 23 and the second mounting surface 25 and between the first side surface 27 and the second side surface 29 and a second end surface 33 between the first mounting surface and the second mounting surface and between the first side surface and the second side surface and on an opposite side of the insert from the first end surface.

The insert 21 further comprises a first groove 35 extending substantially diagonally across the first side surface 27 and dividing the first side surface into discrete, separated first and second first side support surfaces 37 and 39, respectively. The insert 21 further comprises a second groove 41 extending substantially diagonally across the second side surface 29 and dividing the second side surface into discrete, separated first and second second side support surfaces 43 and 45, respectively.

In the insert 21 shown in FIGS. 1A-D the second side surface 29 (FIG. 1D) is a mirror image of the first side surface 27 (FIG. 1C). As seen, for example, with respect to FIGS. 1A and 1B, the first mounting surface 23 (hidden in FIGS. 1A and 1B) and the identical second mounting surface 25 each have a substantially truncated triangle shape. By contrast, in the insert 21' shown in FIGS. 4A-4C, the second side surface 29' is identical to the first side surface 27', and the first mounting surface 23' and the second mounting surface 25' each have a substantially rhomboidal shape (which may include a square or rectangular shape).

The insert 21 can comprise four cutting edges 47, 49, 53, 55 corresponding to each of the support surfaces 37, 39, 43, and 45, respectively. The cutting edges 47 and 49 shall be denominated "left-handed" cutting edges and the cutting edges 53 and 55 shall be denominated "right-handed" cutting edges. In the insert 21' shown in FIGS. 4A-4C, the cutting edges 47', 49', 53', and 55' are all what is here denominated as left-handed, however, it will be appreciated that they might, instead, be all right-handed cutting edges (the diagonal grooves would extend from different corners). In the insert 21, the first cutting edge 47 is formed at an intersection of the first first side support surface 37, the first mounting surface 23, and the first end surface 31. The second cutting edge 49 is formed at an intersection of the second first side support surface 39, the second mounting surface 25, and the second end surface 33. The third cutting edge 53 is formed at an intersection of the first second side support surface 43, the first mounting surface 23, and the second end surface 33. The fourth cutting edge 55 is formed at an intersection of the second second side support surface 45, the second mounting surface 25, and the first end surface 31.

Referring to the first cutting edge 47 for purposes of illustration, and as seen, for example, in FIG. 1C, each cutting edge can comprise a first component 47a that extends along an adjacent one of the first and second mounting surfaces 23 and 25 (in the case of edge 47, along the first mounting surface 23) and a second component 47b that extends along an adjacent one of the first and second end surfaces 31 and 33 (in the case of edge 47, along the first end surface 31). The first and second cutting edge components 47a and 47b can be substantially straight and meet at a point or at a radiused corner 47c, or they can be curved and merge into each other. When the insert 21 is mounted in a cutting tool 200 in the manner shown in FIG. 2, the first component 47a is ordinarily referred to as an axial component and the second component 47b is ordinarily referred to as a radial component.

As seen in FIGS. 1E and 1F, the support surfaces can have specially designed geometries to facilitate formation of chips and removal of chips from a workpiece. FIG. 1E shows the first cutting edge component 47a as having, on the adjacent first first side support surface 37, an axial land 57 immediately inward of the cutting edge component. The illustrated axial land 57 forms an obtuse angle with the adjacent first mounting surface 23 (acute angle $\alpha$ with the perpendicular to the first mounting surface) which can strengthen the cutting edge component 47a, however, other configurations can be provided, including a land area that forms an acute angle with the first mounting surface, or is perpendicular to the first mounting surface, or is omitted entirely.

Inward from the axial land 57, the first first side support surface 37 comprises a axial first rake surface portion 59 that forms an angle with axial the land area and, in the illustrated embodiment, forms an acute angle $\beta$ with a line perpendicular to the first mounting surface 23 and an acute angle with the first mounting surface itself, which configuration can facilitate cutting of the workpiece, however, other configurations can be provided, including an axial first rake surface portion that forms an obtuse angle with the first mounting surface or is perpendicular to the first mounting surface. In the illustrated embodiment, inward from the axial first rake surface portion 59, an axial second rake surface portion 61 is provided that forms an acute angle $\gamma$ with the perpendicular to the mounting surface 23 which, in the illustrated embodiment, is a larger acute angle than the angle $\beta$, and an acute angle with the first mounting surface itself. It will be appreciated that the axial land 57 and axial rake surface portions 59 and 61 can have configurations other than those illustrated.

FIG. 1F shows a second cutting edge component 49b (identical to the first cutting edge component 47b) as having, on the adjacent second first side support surface 39, a radial land 63 immediately inward of the cutting edge component. The illustrated radial land 63 forms an obtuse angle with the adjacent second end surface 33 (acute angle $\delta$ with perpendicular to second end surface) which can strengthen the cutting edge component 49b, however, other configurations can be provided, including a land area that forms an acute angle with the first mounting surface, or is perpendicular to the first mounting surface, or is omitted entirely.

Inward from the radial land 63, the second first side support surface 39 comprises a radial first rake surface portion 65 that forms an angle $\epsilon$ with a perpendicular to the first end surface 33 which, in the illustrated embodiment, is an acute angle and can facilitate cutting of the workpiece, and an acute angle with the first end surface itself, however, other configurations can be provided, including a radial first rake surface portion that forms an obtuse angle with the first end surface or is perpendicular to the first end surface. In the illustrated embodiment, inward from the radial first rake surface portion 65, a radial second rake surface portion 67 is provided that forms an angle with the radial first rake surface portion and forms, in the illustrated embodiment, a larger acute angle $\zeta$ with the perpendicular to the first end surface 33 than the radial first rake surface portion (and a smaller acute angle with the first end surface itself). In the illustrated embodiment, inward from the radial second rake surface portion 67, a radial third rake surface portion 69 is provided that forms an angle with the radial second rake surface portion and forms, in the illustrated embodiment, a smaller acute angle $\eta$ with the perpendicular to the first end surface 33 than the radial second rake surface portion. The radial third rake surface portion 69 forms an acute angle with the first end surface 33. It will be appreciated that the radial land 63 and the radial rake surfaces 65, 67, and 69 can have configurations other than those illustrated.

Inward of any geometry provided by the cutting edges and the rake surface portions, if provided, the support surfaces will ordinarily be substantially flat until they intersect with the grooves in the first and second side surfaces. In a presently preferred embodiment of the insert, the grooves 35 and 41 divide the side surfaces 27 and 29 into discrete, separated, triangular first and second first side support surfaces 37 and 39, and 43 and 45. With respect, for example, to the first side surface, the first and second first side support surfaces 37 and 39 are each bounded along first and second edges thereof by rake surfaces 59 and 65 forming non-zero angles with the first and second side support surfaces and along third edges thereof by the groove (35). A plane of, for example, the first first side support surface 37 forms an angle of between 60 and 85 degrees, more preferably about 79 degrees, with a plane of the first end surface 31 and an angle of between 45 and 85 degrees, more preferably 77 degrees, with a plane of the first mounting surface 23.

Figure 1G:
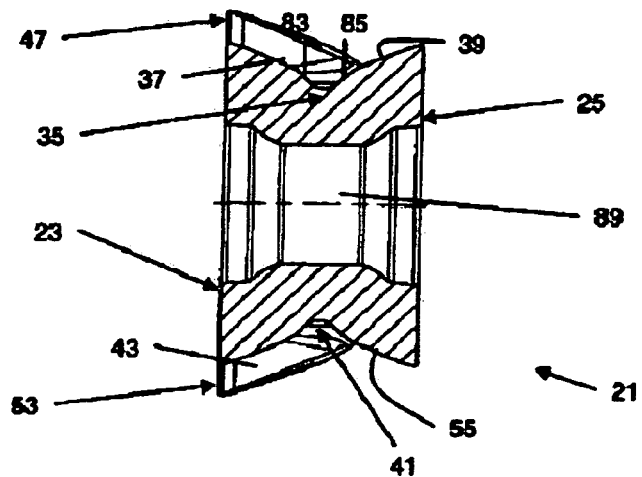
FIG. 1G is a cross-sectional view taken at section 1G-1G of FIG. 1B.
Figure 5A:
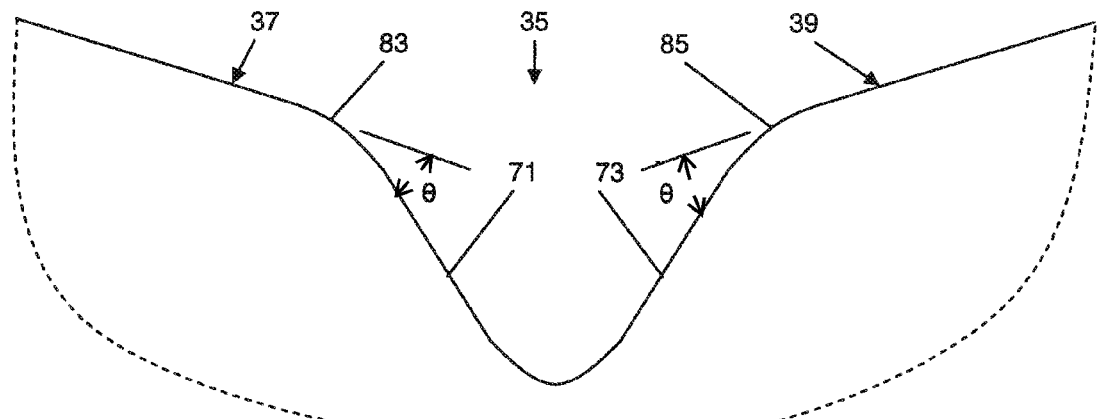
FIGS. 5A and 5B are schematic views showing portions of a side face of an insert with a U-shaped groove and a V-shaped groove, respectively.
Figure 5B:
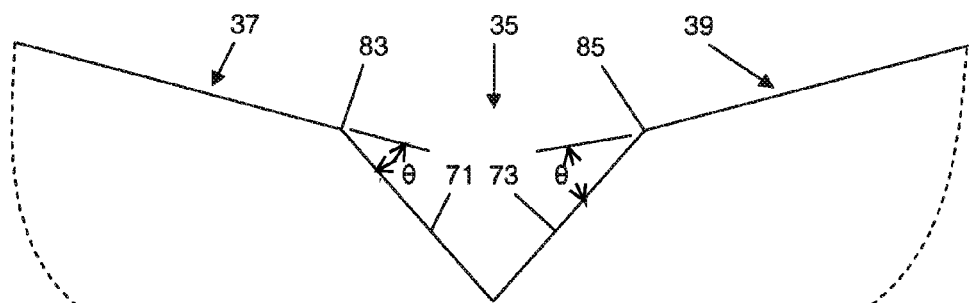

As seen, for example, with respect to FIG. 1G, the first and second grooves 35 and 41 are ordinarily one of substantially U-shaped and substantially V-shaped. Discussing for purposes of illustration, the first groove 35 (it being appreciated that the second groove is identical or a mirror image of the first groove), as seen in FIGS. 5A (U-shaped groove) and 5B (V-shaped groove), the first groove has first and second groove side surfaces 71 and 73 forming non-zero angles θ with adjacent portions of the first and second first side support surfaces 37 and 39, respectively. Forming the groove side surfaces 71 and 73 so that the grooves are depressed relative to the side support surfaces can facilitate flow and removal of chips cut from a workpiece. In the illustrated examples, the first and second groove side surfaces 71 and 73 are substantially flat, however, they may be curved. The first and second groove side surfaces 71 and 73 may merge gradually into the first and second first side support surfaces 37 and 39 as shown in FIG. 5A, or they may intersect with the first and second first side support surfaces along a line or sharp curve as shown in FIG. 5B. The first and second groove side surfaces 71 and 73 may meet at a curved bottom as shown in FIGS. 1G and 5A, a flat bottom (not shown), or as shown in FIG. 5B, at a line or sharp curve.

Again discussing the first groove 35 for purposes of illustration, as seen in FIG. 1A an 1C, opposite ends 75 and 77 of each groove intersect with the first end surface 31 and the second end surface 33, respectively. The ends 75 and 77 of the grooves can flare outwardly to larger widths which can, among other things, facilitate removal of chips cut from a workpiece.

The first end surface 31 and the second end surface 33 ordinarily each comprise at least one clearance surface portion adjacent a corresponding cutting edge and at least one insert supporting surface portion remote from the corresponding cutting edge. As seen, for example, in FIG. 1A, discussing the first end surface 31 and the first cutting edge 47 for purposes of illustration, the first end surface comprises a clearance surface 79 adjacent the first cutting edge, which is referred to here as its corresponding cutting edge. When the milling tool 200 shown in FIG. 2 turns about its axis of rotation in a cutting direction, the clearance surface follows the cutting edge. As seen in FIG. 1A, the first end surface 31 further comprises a supporting surface portion 81 that abuts an abutment surface (not shown) in a recess on the milling tool when the second cutting edge 49 is in use. The supporting surface portion 81 can also be remote from what shall be referred to here as its corresponding cutting edge 47. In this way, the supporting surface portion on any end surface that is functioning to support the insert is remote from the nearest (non-working) cutting edge, which reduces the risk of damage to that cutting edge.

Each of the first groove 35 and the second groove 41 has two longitudinal edges that intersect each of the first end surface and the second end surface. Again, discussing the first groove 35 for purposes of illustration, as seen in FIG. 1A, the first groove includes two longitudinal edges 83 and 85 that intersect, for example, the first end surface 31. The at least one insert supporting surface portion 81 on the first end surface 31 is disposed even with or below a point 87 at which one of the longitudinal edges 83 of the groove 35 closest to the cutting edge 47 corresponding to that at least one insert supporting surface 81 intersects the first end surface.

A through hole 89 ordinarily extends between the first mounting surface 23 and the second mounting surface 25. As seen in FIGS. 2 and 3, a clamping screw 91 extends through the through hole and threads on the clamping screw mate with threads (not shown) on the milling tool toolholder body. An enlarged head of the screw 91 abuts a clamping surface in the through hole to clamp the insert relative to the toolholder body.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application Nos. 10189749.4 and 10189748.6, from which this application claims priority, are incorporated herein by reference.

What is claimed is:

1. A cutting insert, comprising:
    a first mounting surface;
    a second mounting surface on an opposite side of the insert from the first mounting surface;
    a first side surface between the first mounting surface and the second mounting surface;
    a second side surface between the first mounting surface and the second mounting surface and on an opposite side of the insert from the first side surface;
    a first end surface between the first mounting surface and the second mounting surface and between the first side surface and the second side surface;
    a second end surface between the first mounting surface and the second mounting surface and between the first side surface and the second side surface and on an opposite side of the insert from the first end surface, wherein the first end surface and the second end surface each comprises at least one clearance surface portion adjacent a corresponding cutting edge and at least one insert supporting surface portion remote from the corresponding cutting edge; and
    a first groove extending substantially diagonally across the first side surface and dividing the first side surface into discrete, separated, triangular first and second first side support surfaces, the first and second first side support surfaces each being bounded along first and second edges thereof by rake surfaces forming non-zero angles with the first and second side support surfaces and along third edges thereof by the first groove.

2. The cutting insert as set forth in claim 1, further comprising a first end surface disposed between the first mounting surface and the second mounting surface and adjacent the first side surface, a plane of the first first side support surface forming an angle of between 60 and 85 degrees with a plane of the first end surface and an angle of between 45 and 85 degrees with a plane of the first mounting surface.

3. The cutting insert as set forth in claim 1, wherein the first mounting surface and the second mounting surface each have a substantially rhomboidal shape.

4. The cutting insert as set forth in claim 1, further comprising a second side surface disposed between the first mounting surface and the second mounting surface, wherein the second side surface is identical to the first side surface.

5. The cutting insert as set forth in claim 1, further comprising a second side surface disposed between the first mounting surface and the second mounting surface, wherein the second side surface is a mirror image of the first side surface.

6. The cutting insert as set forth in claim 1, wherein the first mounting surface and the second mounting surface each have a substantially truncated triangle shape.

7. The cutting insert as set forth in claim 1, further comprising four cutting edges, each cutting edge corresponding to a support surface.

8. The cutting insert as set forth in claim 7, further comprising:
- a second side surface between the first mounting surface and the second mounting surface and on an opposite side of the insert from the first side surface;
- a first end surface between the first mounting surface and the second mounting surface and between the first side surface and the second side surface;
- a second end surface between the first mounting surface and the second mounting surface and between the first side surface and the second side surface and on an opposite side of the insert from the first end surface, wherein a first component of each cutting edge extends along one of the first and second mounting surfaces and a second component of each cutting edge extends along one of the first and second end surfaces.

9. The cutting insert as set forth in claim 1, further comprising
- a first cutting edge formed at an intersection of the first first side support surface, the first mounting surface, and the first end surface,
- a second cutting edge formed at an intersection of the second first side support surface, the second mounting surface, and the second end surface,
- a third cutting edge formed at an intersection of the first second side support surface, the first mounting surface, and the second end surface, and
- a fourth cutting edge formed at an intersection of the second second side support surface, the second mounting surface, and the first end surface.

10. The cutting insert as set forth in claim 1, wherein the first groove is one of substantially U-shaped and substantially V-shaped.

11. The cutting insert as set forth in claim 1, wherein the first groove has first and second side surfaces forming non-zero angles with the first and second first side support surfaces.

12. The cutting insert as set forth in claim 11, wherein the first and second side surfaces are substantially flat.

13. The cutting insert as set forth in claim 1, wherein the first and second first side support surfaces are substantially flat.

14. The cutting insert as set forth in claim 1, wherein the first groove has two longitudinal edges that intersect each of the first end surface and the second end surface, and that the at least one insert supporting surface portion on each of the first end surface and the second end surface is disposed even with or below a point at which one of the longitudinal edges of a groove closest to the cutting edge corresponding to that at least one insert supporting surface intersects the one of the first end surface and the second end surface.

* * * * *